April 28, 1964     J. V. OLIVEAU     3,130,985
DEVICE FOR DISCONNECTING PLURAL SUPPLY LINES
Filed Aug. 17, 1960     3 Sheets-Sheet 1
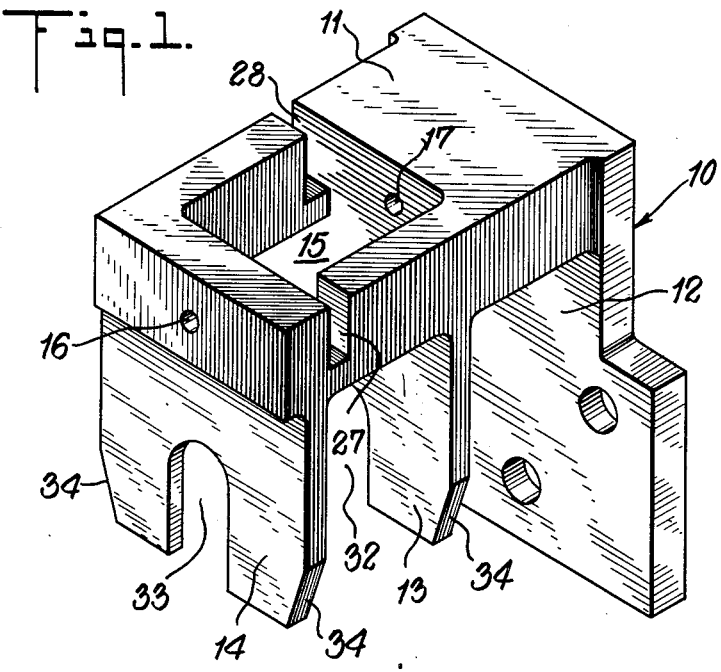
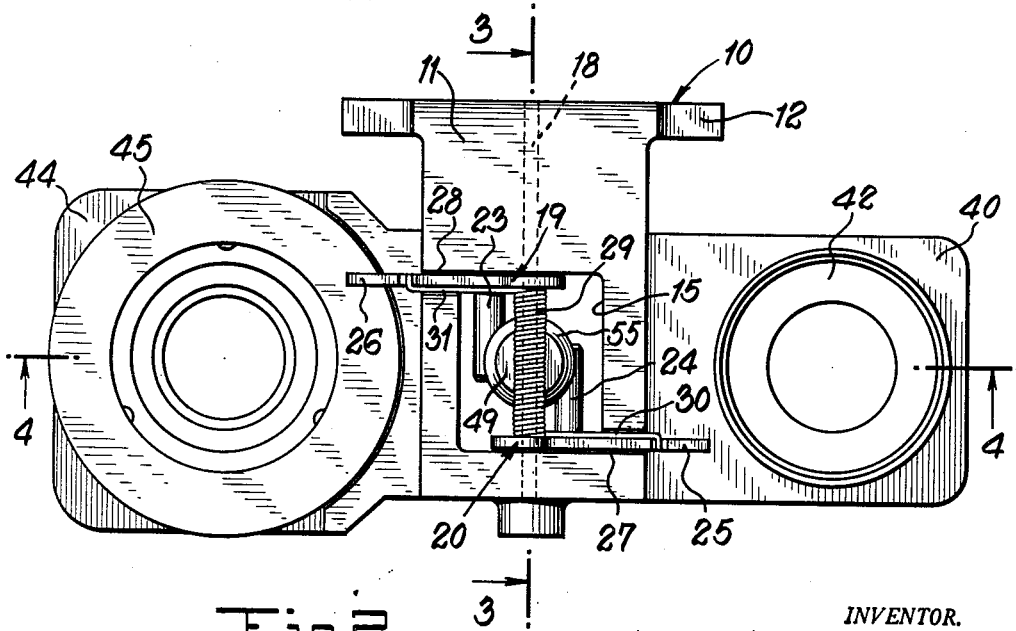
INVENTOR.
JOHN V. OLIVEAU
BY
*Benj. T. Rauber*
ATTORNEY April 28, 1964 J. V. OLIVEAU 3,130,985
DEVICE FOR DISCONNECTING PLURAL SUPPLY LINES
Filed Aug. 17, 1960 3 Sheets-Sheet 2

INVENTOR.
JOHN V. OLIVEAU
BY
ATTORNEY

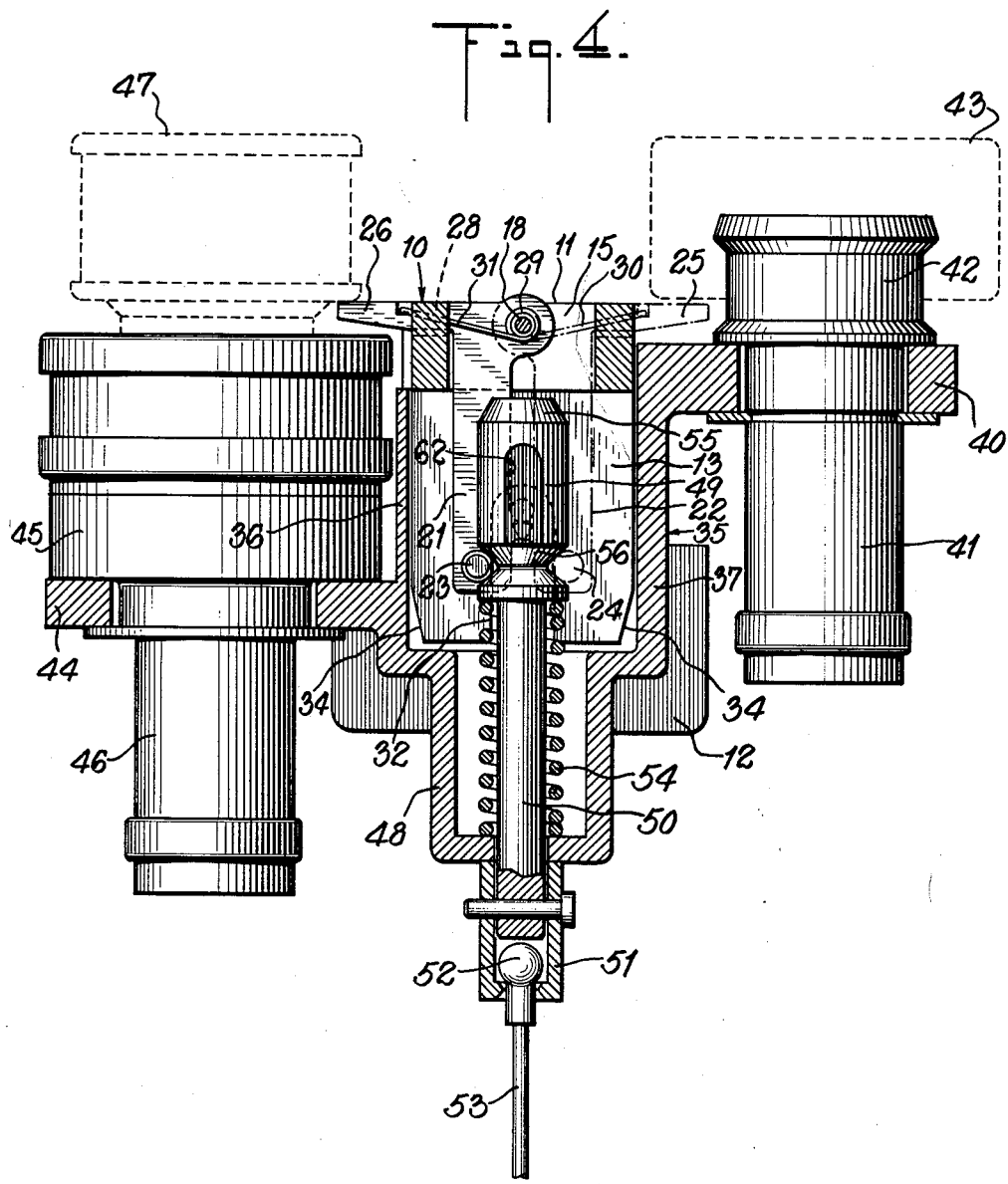

United States Patent Office 3,130,985
Patented Apr. 28, 1964

3,130,985
DEVICE FOR DISCONNECTING PLURAL SUPPLY LINES
John V. Oliveau, Greenwich, Conn., assignor to Aerotec Industries, Inc., Greenwich, Conn., a corporation of Connecticut
Filed Aug. 17, 1960, Ser. No. 50,229
6 Claims. (Cl. 285—1)

My invention relates to a disconnect for disconnecting a pair of delivery lines to the personnel of an aircraft from a pair of supply lines from the aircraft's supply.

The disconnect of my invention provides a dual connection which may be connected by the pilot after entering the aircraft or ship. This connection may be made by pushing the fittings at the lower or entrance ends of the delivery lines into mating sockets at the upper or delivery ends of the supply lines. The fittings are of the standard air force type with a "snap in" engagement in the sockets and lock therein by a ball detent type of lock. They may be connected into the sockets by merely pushing them into the sockets and are detached and freed from the sockets by tilting them from the axis of alignment with the sockets.

My invention provides a disconnect mechanism which automatically disconnects the sockets and supply lines from the fittings of the delivery lines as the pilot is ejected from the ship on bailing out and also from the seat to which the pilot is attached so that it may clear the ship.

The disconnect comprises a mounting bracket which is permanently secured to the seat and a mounting member or block assembly detachably carried by the bracket which incorporates the mating sockets of the aircraft or ship's supply lines and a locking and ejecting mechanism which locks the supply line sockets to the bracket in normal position and, on ejection of the pilot or other personnel, disconnects the fittings from the sockets and the sockets from the bracket. The automatic separating or disconnect mechanism is attached to the airship by a lanyard which permits limited movement of the pilot without disconnecting the lines but, on ejection to the length of the lanyard, actuates the disconnect.

An embodiment of the invention is shown by way of example in the accompanying drawings, in which:

FIG. 1 is a perspective view of a bracket of the disconnect,

FIG. 2 is a plan view of the disconnect,

Figure 3:
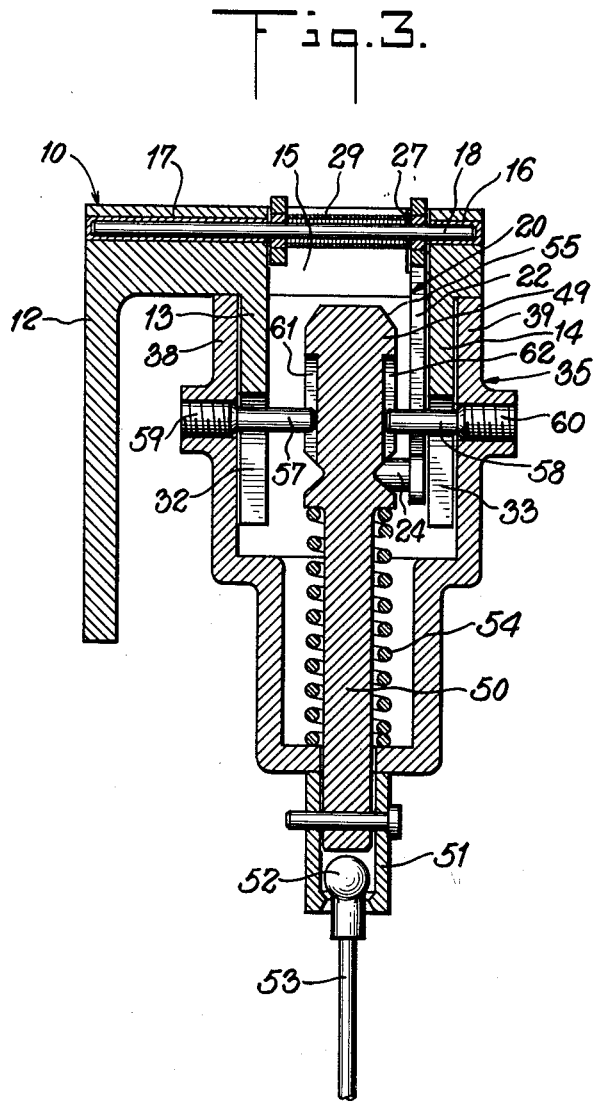
FIG. 3 is a vertical section of the disconnect taken on line 3—3 of FIG. 2, and, FIG. 4 is a vertical section of the disconnect taken on line 4—4 of FIG. 2.

As shown in FIG. 1, the bracket 10 comprises a horizontal platform 11 joined integrally at one end to a vertical attaching plate 12 and having spaced from each other and from the plate 12 a pair of depending parallel guide plates 13 and 14. Between the guide plates a rectangular opening 15 is formed in the platform 11. In a pair of holes 16 and 17 co-axial on a horizontal axis at right angles to the plate 12 is mounted a shaft 18, FIGS. 2, 3 and 4, on which are mounted a pair of bell cranks 19 and 20 to engage an element of the mounting member as it is pushed upwardly from below the bracket toward the opening 15. These bell cranks are rotatably mounted on the shaft 18 and have first depending arms 21 and 22 carrying at their lower ends locking rods or followers 23 and 24 projecting horizontally past the center line of the opening 15 to overlap as shown in FIG. 2. The bell cranks 19 and 20 also have horizontal second arms 25 and 26 extending through channels 27 and 28 in the platform 11 at diagonally opposite corners of the opening 15. A coiled first spring 29 encircling the shaft 18 and having ends 30 and 31 hooked over the arms 25 and 26, respectively, hold the arms 25 and 26 downwardly in the channels 27 and 28 and the arms 21 and 22 in vertical position as shown in FIGS. 3 and 4. The arms 21 and 22 may be swung apart against the action of the spring 29 to receive a latch engageable member of the fitting support or block assembly, the arms 25 and 26 being simultaneously tilted upwardly. The guide plates 13 and 14 have upwardly extending notches 32 and 33 to receive projecting parts of the fitting support and the lower corners of these guide plates are chamfered as at 34 to facilitate the upward insertion of the fitting support.

The mounting member comprises a box 35 of rectangular form and having a recess open at its upper end. The mounting member comprises a pair of spaced parallel walls 36 and 37 which cover the vertical edges of the guide plates 13 and 14 as shown in FIG. 4 and a pair of parallel walls 38 and 39 at right angles to the walls 36 and 37 and spaced to slide over the outboard surfaces of the guide plates 13 and 14. Extending outwardly from the upper end of the wall 35, FIG. 4, is a shelf 40 having an opening to receive a connector socket 41 of a supply connection having a downwardly opening socket 42 to receive the lower end of a fitting member indicated in broken lines at 43. The fitting member locks into the socket with a snap action and may be freed from the socket by tilting it on its lower edge. The arm 25 of the bell crank extends under the edge of the fitting member 43 so that when the arm is tilted upwardly from its horizontal position it tilts the fitting member to release it. A shelf 44 extends outwardly from the lower part of the wall 36 to support a connector socket 45 and terminal connector 46, the position of the shelf 44 being lower than that of the shelf 40 to accommodate the greater height of the connector socket 45. The connector socket 45 receives a fitting member 47 in a manner similar to the seating of the fitting member 43, the arm 26 projecting under the rim of the fitting member to tilt the fitting member as the arm rocks upwardly. A recess 48 opens downwardly from the box and has an opening in its bottom for the stem of a latch engageable member.

The latch engageable member for holding the connector sockets in engagement with the bracket comprises a latch engageable member 49 having a stem 50 extending downwardly through the hole in the bottom of the recess 48 and a clevis 51 secured to the lower end of the stem by a cross pin and engaging a head 52 of a lanyard 53 for attachment to the ship. The head and stem are biased upwardly to the position shown in FIG. 4 with the clevis 51 abutting the bottom of the recess by a coil spring 54 confined between the bottom of the recess and the bottom of the latch engageable member. The upper end of the latch engageable member is chamfered as at 55 so that when the mounting member is slid upwardly about the plates 13 and 14 of the bracket it wedges apart the followers 23 and 24. As the mounting member and latch engageable member are then moved further up to the position shown in FIG. 4 the followers are moved into a circumferential groove 56 by the action of the spring 29 on the arms 19 and 20. After the mounting member has been locked in position the fitting members 43 and 47 are inserted in their respective sockets.

When the mounting member is inserted upwardly into the bracket the spring 54 exerts sufficient force to wedge the followers 23 and 24 and the arms 19 and 20 apart to permit the upward passage of the latch engageable member 49 to locking position with the followers engaging the circumferential groove 56. The pressure of the spring 29 on the arms is sufficient to hold the arms and followers in latched position against the ordinary stresses of use. However, when the pilot or other personnel is ejected the downward pull of the lanyard 53 relative to the apparatus is sufficient to pull the latch engageable member downwardly against the action of the springs 54 and 29. This moves the lower ends of the arms 19 and 20 apart and tilts the arms 25 and 26 upwardly to tilt and disengage the fitting members 43 and 47.

The downward movement of the latch engageable member relative to box 35 may be limited by studs 57 and 58 secured in bosses 59 and 60 in the walls 38 and 39, respectively and projecting into vertical grooves 61 and 62, respectively in the latch engageable members 49, each groove having a closed upper end against which the ends of the studs abut as the latch engageable member reaches its lower limit of travel. The bosses 59 and 60 move in the recesses 32 and 33, respectively.

It is apparent that the box forms a recess to receive the guide plates 13 and 14 of the bracket and thus to position the latch engageable member 49 in alignment with the downwardly depending arms 21 and 22. The arms 21 and 22 form a latch, the followers 23 and 24 forming latch elements to snap into the groove or recess 56 of the latch engageable member 49. The surfaces of the groove and latch elements 23 and 24 are inclined to form a cam surface so that a force acting vertically on the latch engageable member has a horizontal component tending to swing the latch arms apart to release the latch engageable member. The arms 19 and 20 form lifting fingers to tilt the fittings out of the sockets 41 and 45. The forms of these elements may be changed or varied without changing their cooperative relationship or mode of action.

Having described my invention, what I claim is:

1. A device for disconnecting plural supply lines comprising:
   I. A supporting bracket having a pair of parallel guide plates;
   II. a mounting member having
       A. a pair of transversely spaced connector sockets adapted to receive fitting members and
       B. a means forming a recess, said recess located between and opening in the same direction as said sockets to receive said guide plates therein;
   III. a release latch comprising,
       A. a pair of bell cranks pivotally mounted on said bracket, each bell crank having
           (1) a first arm thereof extending below its pivotal axis and between said guide plates,
           (2) A second arm thereof having a portion projecting over the rim of one of said sockets and
           (3) a follower carried by said first arm;
   IV. a first spring mounted on said bracket and engaging said bell cranks to bias said first arms toward each other;
   V. a latch engageable member movably mounted on said mounting member, a portion of said latch engageable member extending within said recess adjacent and between said first arms and having,
       A. a cam surface thereon adapted to be engaged by said followers; and
   VI. a second spring mounted on said mounting member and engaging said latch engageable member to bias said latch engageable member to a position where said followers rest on said cam surface in a position of maximum inward travel of said first arms toward each other; and
   VII. means to move said latch engageable member to an unlatching position whereby said followers are cammed radially outwardly from said latch engageable member by said cam surface, thereby pivoting said bell cranks about said pivotal axis to move the outer ends of said second arms into engagement with fitting members disposed in said sockets to force said fitting members and said connector sockets axially apart.

2. The device of claim 1 in which one of the first arms of said bell crank is positioned adjacent to one of said guide plates of said supporting bracket and the other is adjacent the opposite face of the other guide plate and in which said followers are rods extending in from said first arms to engage said latch engageable member.

3. The disconnect of claim 1 in which the latch engageable member is a head having a chamfered upper edge and a circumferential groove with inclined sides to receive said followers.

4. The disconnect of claim 3 in which said head has a stem extending downwardly through said recess and in which said second spring is confined between said head and the bottom of said recess.

5. The disconnect of claim 1 in which said bracket comprises a vertical securing plate and a horizontal platform extending therefrom from which said guide plates extend downwardly, said platform having an opening spanning the distance between said plates.

6. The disconnect of claim 4 having a lanyard attached to said stem.

References Cited in the file of this patent

UNITED STATES PATENTS

| | | |
|---|---|---|
| 2,457,478 | Letvin | Dec. 28, 1948 |
| 2,551,533 | Gernheuser | May 1, 1951 |
| 2,613,947 | Jedrzykowski | Oct. 14, 1952 |
| 2,660,456 | Maddock | Nov. 29, 1953 |
| 2,788,991 | Neuhauser | Apr. 16, 1957 |
| 2,859,422 | Oliveau | Nov. 4, 1958 |
| 2,930,633 | Ethington | Mar. 29, 1960 |
| 2,977,078 | Fitt | Mar. 28, 1961 |
| 2,990,596 | Oliveau | July 4, 1961 |